United States Patent
Krenkel et al.

[11] Patent Number: 6,086,814
[45] Date of Patent: *Jul. 11, 2000

[54] METHOD OF MANUFACTURING A FRICTION ELEMENT

[75] Inventors: Walter Krenkel, Ludwigsburg; Richard Kochendorfer, Stuttgart, both of Germany

[73] Assignee: Deutsche Forschungsanstallt fur Luft-und Raumfahrt, E.V., Cologne, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/836,089
[22] PCT Filed: Oct. 17, 1995
[86] PCT No.: PCT/EP95/04079
  § 371 Date: Jul. 23, 1997
  § 102(e) Date: Jul. 23, 1997
[87] PCT Pub. No.: WO96/13470
  PCT Pub. Date: May 9, 1996

[30] Foreign Application Priority Data

Oct. 28, 1994 [DE] Germany .............................. 44 38 455

[51] Int. Cl.⁷ .................................................. C04B 35/573
[52] U.S. Cl. .......................... 264/610; 264/29.1; 264/317
[58] Field of Search .................................. 264/29.1, 610, 264/317

[56] References Cited

U.S. PATENT DOCUMENTS

| | | | |
|---|---|---|---|
| 2,938,807 | 5/1960 | Anderson | 264/670 |
| 3,712,428 | 1/1973 | Marin | 188/251 A |
| 3,759,353 | 9/1973 | Marin | 188/71.5 |
| 3,848,040 | 11/1974 | Confer et al. | 264/317 |
| 3,859,160 | 1/1975 | Marin | 161/42 |
| 3,867,491 | 2/1975 | Marin | 264/29 |
| 3,947,550 | 3/1976 | Fitchmun | 264/645 |
| 4,514,240 | 4/1985 | Heraud | 156/89 |
| 4,747,873 | 5/1988 | Kamioka | 75/229 |
| 4,806,295 | 2/1989 | Trickett | 264/317 |

FOREIGN PATENT DOCUMENTS

| | | |
|---|---|---|
| 0046520 | 3/1982 | European Pat. Off. .............. 264/610 |
| 0051535 | 5/1982 | European Pat. Off. . |
| 0300756 | 1/1989 | European Pat. Off. . |
| 2130433 | 2/1972 | Germany . |
| 3731540 | 3/1989 | Germany . |
| 4127113 | 2/1993 | Germany . |
| 1457757 | 12/1976 | United Kingdom . |

OTHER PUBLICATIONS

Entwicklung Integraler Leichtbaustrukturen Aus Faserkeramik, by Walter Krenkel, Volkmar Dollhopf und Frank Kocian, DLR–Stuttgart, published at the VDI Werkstofftag '94, Leichtbau–Strukturen und Leichtebauteile, in Duisburg, 9./10. 3.1994.

*Primary Examiner*—James Derrington

[57] ABSTRACT

Disclosed is a method for manufacturing a friction element designed for frictional contact with a body and for use, in particular, in brakes or clutches. In the method, a porous carbon block, which approximately matches the shape of the end of the abrasion unit, is produced, liquid silicon is infiltrated into the pores of the carbon block, and the block is ceramized by initiating a chemical reaction to form silicon carbide. In order to further fashion a friction element of this kind to increase its resistance to thermal stresses and so that it is also easy to manufacture, the porous carbon block is shaped, before the silicon is infiltrated into it, in such a way that cavities and/or recesses are formed in certain internal and/or external zones for cooling and/or reinforcement purposes, the cavities and/or recesses retaining essentially the same shape and size after ceramization.

18 Claims, 3 Drawing Sheets

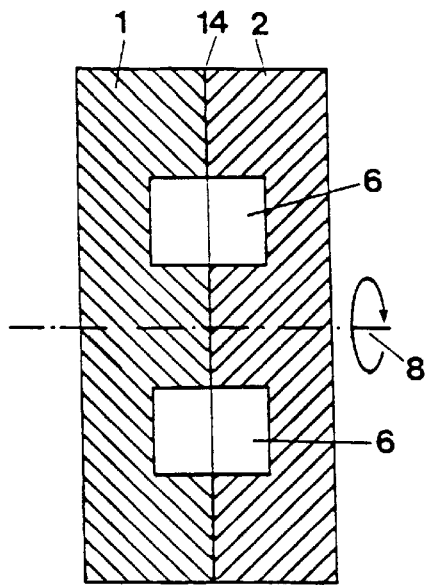
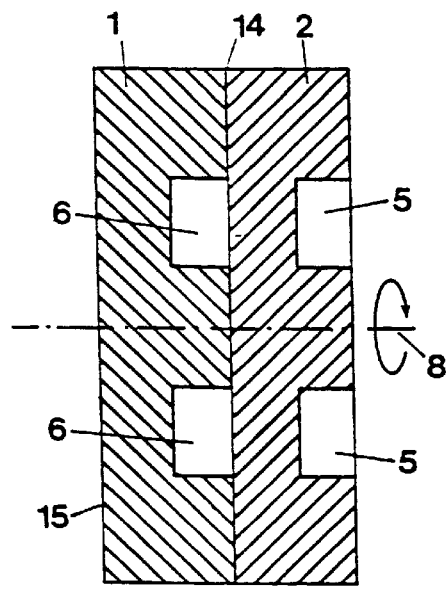
FIG. 6
FIG. 7
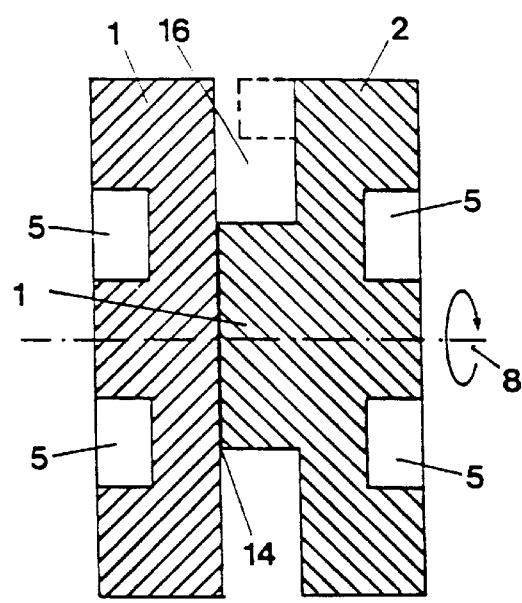
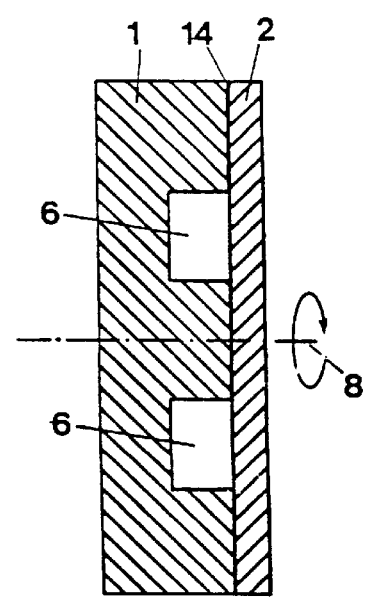
FIG. 8
FIG. 9

METHOD OF MANUFACTURING A FRICTION ELEMENT

BACKGROUND OF THE INVENTION

The present invention relates to a method for the manufacture of a friction unit for frictional engagement with a counter-body, especially for the manufacture of a brake or clutch body, in which a porous carbon body is prepared which corresponds approximately to the final contour of the friction unit wherein the pores of this carbon body are infiltrated with fluid silicon, and the body is ceramicized by introducing a chemical reaction with the formation of silicon carbide.

A method for the manufacture of a friction unit was presented by a work group of the DLR (Deutsche Forschungsanstalt für Luft- und Raumfahrt e.V.), of Stuttgart, Institut für Bauweisen- und Konstruktionsforschung, at the VDI Materials Convention in Duisburg on Mar. 9–10, 1994, the theme of which was lightweight structures and lightweight components, in the framework of the lecture entitled "Development of integral lightweight structures of ceramic fiber." In this lecture, a technology for manufacturing carbon fiber-reinforced carbons was presented. The carbon fiber-reinforced carbons are infiltrated with fluid silicon by a so-called "fluid silicification method" and subjected to a heat treatment, wherein the silicon is converted with carbon to SiC. One possible application of these C/C-SiC materials is, among others, brake disks.

Increasingly severe requirements are being made of brakes, especially in motor vehicle and aircraft construction. The speeds which are attained nowadays by such vehicles are constantly increasing. When brakes are applied, the kinetic energy is converted by friction to heat, which is absorbed by the brake disk and the brake linings. A brake system of this kind is accordingly limited by the friction characteristics of the brake material and its ability to store and remove heat. In general, brake materials must have very good thermomechanical properties, high and constant friction characteristics and good resistance to abrasion. Ordinary brake disks of cast iron or steel, which are today used in ordinary automobile construction, permit temperatures of approximately 650° C. Brakes of carbon fiber-reinforced carbon materials (C/C) developed in recent years, such as those described for example in DE-A1 3 24 200, allow temperatures up to 1000° C.

At the above-described VDI presentation, a C/C-SiC material was exhibited, as stated above, which shows decided advantages over a C/C material, especially in regard to thermal shock resistance, oxidation resistance, moisture absorption and frictional performance.

Setting out from the above-described state of the art, the present invention is addressed to the problem of improving a method for the manufacture of such a friction unit of the kind described above such that it will withstand an elevated thermal stress and furthermore will be able to be manufactured in a simple manner.

SUMMARY OF THE INVENTION

The above stated object is obtained by the method of the invention in that, before the silicon infiltration, the porous carbon body is so structured that cavities and/or recesses are formed in defined inner and/or outer areas for cooling and/or stiffening, which are substantially retained in their shape and size after the ceramicization. As it is generally known, ceramic material or ceramicized material is extremely difficult to work, so that structuring could be performed in such heretofore known friction units only at great expense. Consequently such structuring has been performed only on the outer circumference, for example in the form of radial bores in such components for the purpose of giving the friction units, for example, the necessary outside contour. By the method of the invention it is possible to create even complex structures in the form of recesses, since such recesses are formed in a state of the carbon body in which no ceramicization, which is performed by infiltration of silicon followed by heat treatment, is present. Furthermore, with the method of the invention not only are recesses formed in outside surfaces of the friction unit, but it is also possible to produce closed, or only partially closed cavities within the friction unit at precisely defined locations. Such creation of cavities and/or recesses in the body is performed practically with the carbon body in the green state in which it is still easy to work mechanically, or in which the carbon fiber body itself is created and structured. With this method a low-cost manufacture of friction units in series production is economically feasible. Such structuring by means of recesses and/or cavities, which can serve, in one instance, to stiffen a friction unit, a brake disk for example, and can serve especially for creating cavities for cooling, is especially important in the ceramicized friction units, precisely because such ceramicized friction units are used under very high stresses and hence high temperatures. Applications are, for example, brake units of aircraft as well as rail vehicles and high-performance motor vehicles.

An especially desirable method is provided if a green body is formed first as a foreproduct of the porous carbon body, which is a carbon fiber body permeated by cured polymers. Such a method, with the formation of a foreproduct of carbon fibers coated with polymers, offers special advantages with regard to the subsequent silicon infiltration technique. A body in the form of a carbon fiber matrix with cured polymers is a foreproduct which is already sufficiently hardened and solidified to be able to be worked in a defined mechanical manner. The formation of the recesses and cavities can also be performed in a stage of the manufacture of such friction units, in which the foreproduct is already present and can be shaped simply both mechanically and in a molding manner.

In order to form closed cavities or partially closed cavities within the friction unit it is possible to insert into the carbon fiber body, before it is ceramicized, one or more cores with dimensions corresponding to the desired recesses and/or cavities, preferably while the body is in a state prior to its infiltration with silicon, and more preferably while it is still greenware prepared in the form of a carbon fiber matrix permeated with polymers. Suitable materials for the cores are rubber, plastic, metal, ceramic or carbon, the materials being selected according to whether a lost core is involved, or a core which is removed in a certain stage of the production of the carbon body. For example, a core of Styropor®, a styrol-polymer based foamy material commercially available from BASF or hard foam plastic has an advantage due to the fact that it can be dissolved out of the friction unit through a vent opening, for example, with a solvent, prior to the silicon infiltration. A core of metal, ceramic or carbon is preferred for the formation of recesses which are formed on an external surface of the friction unit. The cores for shaping the recess are inserted in the area of this recess and, in a later process step, when the body is no longer subject to any substantial deformation, they are removed. Such a core of metal, carbon or ceramic can also be used for the purpose of being first embedded into the fiber matrix while the carbon fiber matrix is being made, from which it is then removed before the recess is completely closed off with a covering layer as the making of the carbon fiber body continues. After the silicon infiltration, such cores, which are externally accessible, are dissolved out, for example from passages running radially outward, which have an approximately uniform cross section from the inside to the outside or have a slight cross-sectional expansion from a radially inner side to a radially outer side of the friction unit. Such cores consist preferably of carbon or ceramic, since these withstand the temperatures in the individual process steps for the production of the friction unit. Also a core formed of rubber is appropriate for being extracted from a forebody after the latter has been made. The removal of rubber cores must take place in a state in which the rubber material of the core is no longer subjected to high temperature stress.

It is furthermore preferred to use cores of a pyrolyzable material, preferably cores of polyvinyl alcohol, in order to produce cavities, especially, within the friction unit, which are inaccessible afterward and, under certain circumstances, have no vent or exhaust openings to the outside of the friction unit. Pyrolyzable material is pyrolyzed and removed substantially without residue as part of the pyrolysis of the carbon body, especially a carbon body in the form of a carbon fiber matrix permeated with a polymer, In order to provide a friction unit with high mechanical strength ratings, especially in the area of the cavities or recesses, during the creation of the carbon fiber-reinforced carbon body the recesses and cavities are surrounded with layers of carbon fibers with a predetermined orientation. The orientation of the fibers can in this case be adapted to the forces and stresses occurring in the friction unit. These fiber layers therefore define such recesses or cavities in the friction unit. For cavities which are to be formed inside of the friction unit and in the area of which they are to have elevated strength, first cores are surrounded with such fiber layers and these cores are then inserted into the carbon fiber matrix. Such cores can be lost cores or cores which are removed in a given stage of the making of the friction unit.

In order to form cavities in a simple manner in the interior of a friction unit, especially cavities which have no connection to the exterior of the friction unit, the friction unit is made up of two individual bodies which have recesses on one exterior side. The two bodies are then joined together, so that the recesses of the one body are covered and closed by the other body. It is apparent not only that such recesses can be formed in both bodies, which then together form a common cavity, but also it is possible to form the recesses only in the one body and configure the other body as a cover disk. Depending on the construction of the friction unit, both bodies can be identical parts which are then joined together. Moreover, not only does a multi-partite make-up of the friction unit make it possible to form cavities easily in the interior of the friction unit, but also to adapt the friction unit, for example in the form of a brake disk or clutch disk, to the qualities required for its use, i.e., the one body is configured as a friction body, while the other body can serve as a core body. The core body in this case bears the surface for frictional engagement with a corresponding counterbody and is adapted material-wise with regard to its frictional properties. The core body serves as a carrier body for the friction body and is fastened, for example, to a hub of a vehicle. Such a core body should then advantageously have the cooling passages and cavities and be adapted with regard to its material properties such that it will have good thermal conductivity and heat capacity.

The various features of novelty which characterize the invention are pointed out with particularity in the claims annexed to and forming part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIGS. 6 and 7 are a sectional representation of friction units which are made of two carbon bodies like the preform in FIG. 1 by a sandwich technique;

FIG. 8 is a sectional representation of a friction unit which is made from two bodies which are constructed like the foreproducts of FIGS. 1 and 2;

FIG. 9 is a section through a friction unit which is made with a body corresponding to the preform of FIG. 1 with an additional covering plate.

DESCRIPTION OF PREFERRED EMBODIMENT

Figure 1:
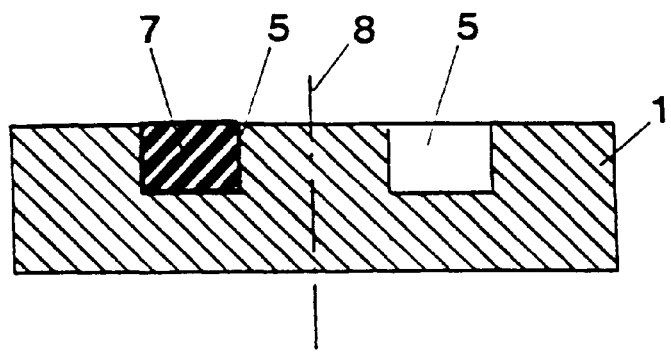
FIG. 1 shows a cross section taken through a preform of a carbon body composed of a carbon fiber matrix for a friction unit, a brake disk for example, having two recesses formed in an upper side.
Figure 2:
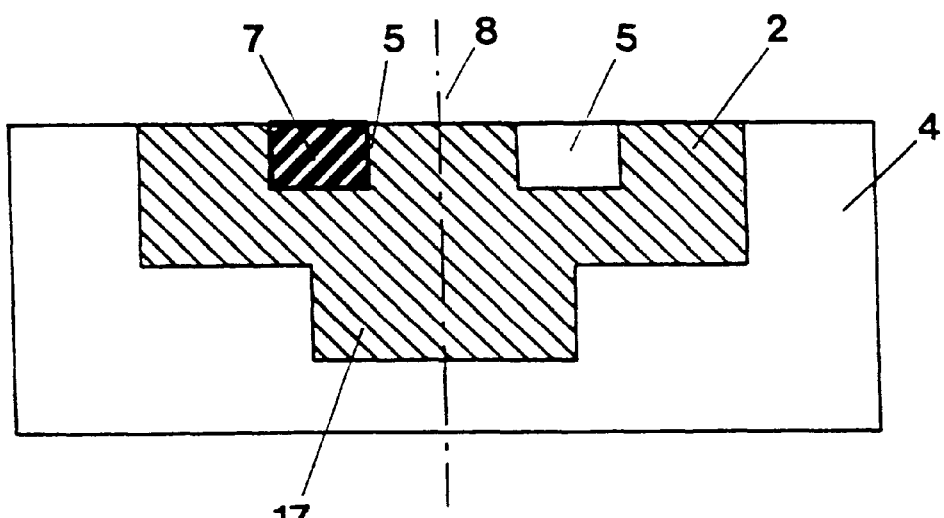
FIG. 2 is a preform similar to FIG. 1; which is built in a molding unit.
Figure 3:
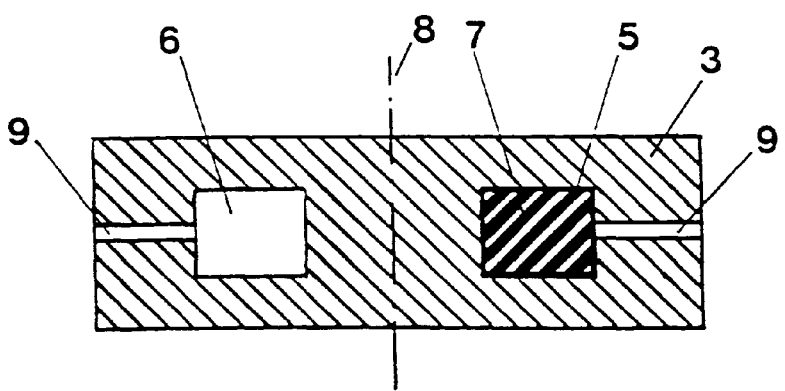
FIG. 3 is a section through a friction unit having two internal, closed cavities.

In FIGS. 1 to 3 various foreproducts 1, 2 and 3 made of a carbon fiber matrix, and having an external shape which corresponds approximately to the finished friction unit are shown. Preferably, to make such foreproducts 1, 2 and 3, carbon fibers of different lengths are laid on a support (not shown) or in a mold 4 like the one shown in FIG. 2, together with woven carbon fiber inserts if desired, so that the foreproducts 1, 2 and 3 are built up. Use of a mold 4 as in FIG. 2 has the advantage that an external shape can easily be given to the foreproduct 2 in a repeatable manner to correspond approximately to the external shape of the ceramicized friction unit, aside from dimensional variations caused by slight shrinkage during the ceramicization. Preferably the carbon fibers will be those which are coated with a polymer layer. Alternatively, a body built up of carbon fibers can then be infiltrated with polymers and then such a forebody can be hardened, so that a polymer matrix is achieved in the carbon matrix and at the same time the entire foreproduct 1, 2 or 3 is given stability of shape.

In the build-up of the foreproduct 1, 2 or 3, in order to form recesses 5 or enclosed cavities 6, cores 7 are embedded which correspond in shape and size to the recess 5 or cavity 6 to be formed. In FIGS. 1 and 2 a core 7 is represented, for example, which is inserted into the carbon fiber body and is removed therefrom after solidification of the foreproduct, so that the recess 5 remains, as represented in the right half of the cross-sectional representation of FIGS. 1 and 2. According to the shape of the core, such a recess can have a round, oval or angular cross section, or else are in rotational symmetry with the axis 8 of the foreproduct 1 or 2, so that both recesses in the foreproducts of FIGS. 1 and 2 form each a space which can be, for example, in the form of a volute corresponding to the best aerodynamic shape of the cooling passage or a volute-shaped core can be used as the core. The same applies to the cavities 6 of the foreproduct of FIG. 3.

Preferably, the cores 7 for forming recesses 5 are cores of a material which can withstand the individual heat treatments used in making the foreproduct, i.e., preferably cores of metal, ceramic or carbon. Such cores can then be used for making additional friction units as often as desired, after they have been removed from the foreproduct 1, 2 and 3.

To form cavities 6 as represented in foreproduct 3 of FIG. 3, cores are likewise used in forming the carbon fiber matrix which do not have to be removed from the foreproduct. For this reason, cores of Styropor or hard foam plastic are inserted into these cavities, which then, when the foreproduct 3 is in a solidified state, are dissolved out by means of a solvent which is injected, for example, through vent passages 9 which have a connection from the outer surface to the cavities 6. These vent passages can then be filled with a polymerizable material having a high carbon residue after pyrolysis and are closed by subsequent ceramicization. Another possibility for producing the cavities 6 by means of lost cores 7 is to insert a core of pyrolyzable material, which in a following step, in which the carbon fiber body is subjected to pyrolysis to burn out a corresponding polymer matrix, for example, is eliminated with substantially no residue. In this case it is not necessary to provide special vent passages 9. A foreproduct such as that represented in FIGS. 1 to 3, is then in an additional step infiltrated with fluid silicon, which by heat treatment is converted to silicon carbide, so that the finished, ceramicized friction unit is obtained.

Another possibility for forming cavities 6 in a foreproduct as represented in FIG. 3 is to insert cores 7 of rubber where the cavities are made. Such rubber cores are to be preferred whenever the cavities 6 are to have passages leading to the exterior of the friction unit, corresponding to the vent passages 9, through with a greater cross section, so that the elastomeric core parts can be extracted through these passages 9 after the foreproduct 3 is completed. In this manner internal cavities 6 can be formed which are undercut in relation to the channels 9, so that these elastomeric cores can be extracted through passages 9 having a smaller cross section than the cavities.

Figure 4:
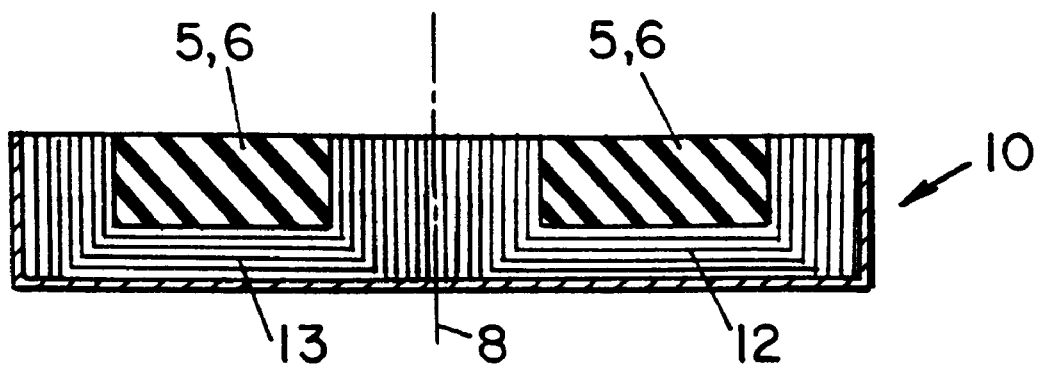
FIG. 4 is a foreproduct in the form of a green body with two recesses filled by cores and a schematically indicated structure of the fiber in the carbon matrix.
Figure 5:
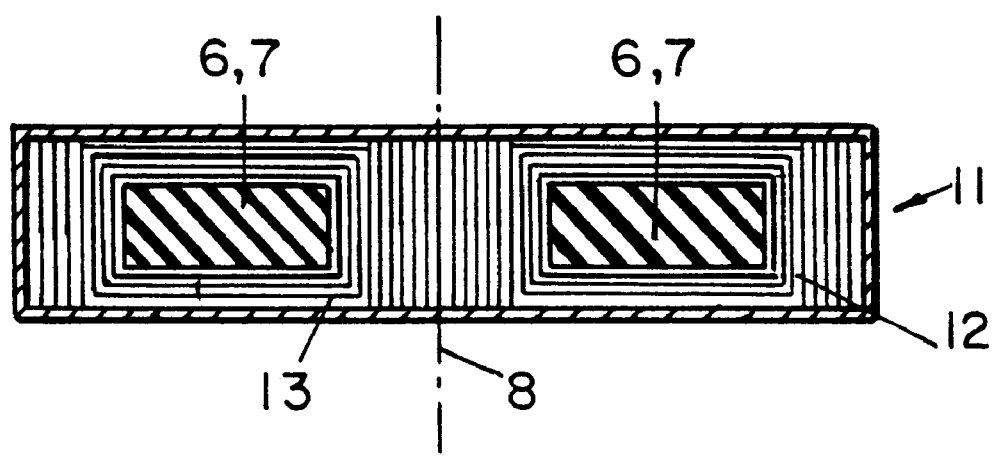
FIG. 5 is a sectional drawing corresponding to FIG. 4 and having two fully enclosed cavities each filled with a core.

FIGS. 4 and 5 show cross sections of foreproducts 10 and 11, which correspond substantially in design to the foreproducts 1 and 3 of FIGS. 1 and 3. In FIGS. 4 and 5, however, carbon fiber layers 12 following the shape of the recess or cavity around the recess 5, or the cavity 6 and a core 7 inserted therein (FIG. 5), are so oriented that they are adapted to the forces occurring in the later friction unit and result in a stable and strong structure of the carbon fiber matrix. In the building up of the carbon fiber matrix, such carbon fiber layers 12 can be laid around previously prepared cores 7 made, for example, of Styropor or hard foam and such previously prepared cores can then be inserted into the carbon fiber matrix. By the procedure described above in connection with the explanation of FIG. 3, such cores can later be dissolved out through similar vent passages not shown in FIG. 5. The individual core bodies or the carbon fiber layers 12 wound about the core body can then be wrapped in carbon fiber cover layers 13. As the embodiments represented in FIGS. 4 and 5 show, the structure of the friction units which are to be made are shaped and built as desired in the green state; in some cases the foreproduct is mechanically worked after it is cured, prior, of course, to infiltration with silicon and ceramicization; so it is not necessary to work on a ceramic material.

In FIGS. 6 to 9 a number of embodiments of modularly constructed, integral friction units are shown, which are made by using foreproducts such as those shown in FIGS. 1 and 2. Accordingly, the same reference numbers for the bodies 1 and 2 are used in FIGS. 6 and 9. The foreproducts can be placed one on the other along a junction line or plane identified by the reference number 14 in the individual FIGS. 6 to 9, and are then bonded together. Foreproducts 1 and 2 can be used as foreproducts or as individual modules for the friction units in FIGS. 6 to 9 in their green state, i.e., in their as yet not ceramicized form. The junction 14 is then filled in the silicon infiltration of the two foreproducts 1 and 2, and thus the two bodies are bonded with a material containing substantially a carbide. Individual bodies 1 and 2, which are each already infiltrated with silicon and ceramicized, can of course be assembled in this ceramicized state, for example with a heat-resistant hard solder, preferably with silicon.

As FIG. 6 shows, cavities 6 can be formed with two bodies 1 as represented in FIG. 1 if the individual recesses 5 of foreproduct 1 are combined to form this cavity 6 through their identical alignment with the axis 8 or axis of rotation of the friction unit (FIGS. 6 to 9). In such an assembly it is not necessary to remove from the cavities 6 any cores remaining from the formation of the carbon fiber matrix.

In FIG. 7 an embodiment is represented in which the friction unit is composed of two foreproducts assembled along the junction plane 14 such that each faces in the same direction, so that, on the one hand the original recesses in foreproduct 1 combine with the outer surface of the other foreproduct 1 to make the cavities 6, while the recesses 5 in the other foreproduct 1 remain on the outside as open recesses. The first foreproduct 1 can serve in this arrangement as a friction body, for example, while its smooth outside surface forms a friction surface 15, while the other foreproduct 1 is a core body. This division into a friction body and a core body is aimed at adapting the material properties of these two bodies to the particular requirements, i.e., the friction body is provided with good friction properties at the friction face 15, while the core body is to have a high mechanical strength, for one thing, so as to form a quasi support for the friction unit, and for another thing it is intended to have good thermal conductivity and heat capacity so as to remove the heat developed at the friction surface 15.

The adaptation of the bodies that are combined in a friction unit, as explained above in connection with FIG. 7, applies accordingly to the arrangements in FIGS. 6, 8 and 9.

In FIG. 8 there is represented a friction unit which is composed of a foreproduct 1 and a foreproduct 2 corresponding to FIGS. 1 and 2. In this arrangement recesses are formed on both of the outer sides; furthermore there is an annular space 16 extending radially from the axis of rotation 8; with appropriate formation, such an annular space 16 could simply have a smaller cross section on the outside, as shown by a broken line in the upper half of FIG. 8, in which, for example, a body of corresponding shape is made in advance.

FIG. 9 is a variant in which the body 1 of FIG. 1 is covered with a plate 18 on the side of the recesses 5, so that cavities are formed accordingly.

As the various embodiments show, the procedure according to the invention permits the formation of recesses and cavities in a stage of the process in which the starting bodies are still easy to shape and work. Furthermore, by the method of the invention, —particularly when a friction unit is composed of a plurality of individual bodies, and especially in the still unceramicized state, —even very complex structures can be achieved by putting together these individual bodies.

The terms and expressions which have been employed are used as terms of description and not of limitation, and there is no intention in the use of such terms and expressions of excluding any equivalents of the features shown and described or portions thereof; it being recognized that various modifications are possible within the scope of the invention.

We claim:

1. A method of manufacturing a friction element comprising preparing a plurality green bodies as preforms of a friction element from carbon fibers, added or infiltrated with a polymer, said friction element having a friction surface, structuring said green bodies to form cavities in defined inner areas with channels which do not end at a friction surface of said friction element for cooling and/or stiffening of said friction element, pyrolyzing said green body to form porous carbon bodies, joining the plurality of carbon bodies whereby a junction is formed, infiltrating the pores and said junction of said carbon body with fluid silicon, and ceramicizing said silicon infiltrated carbon body by introducing a chemical reaction to form silicon carbide.

2. The method of claim 1, wherein the green body is provided with recesses by mechanical working.

3. The method of claim 1, wherein a core is embedded in the green body the core having dimensions substantially corresponding to the cavities to be formed.

4. The method of claim 3, wherein the core is removed before and/or after the silicon infiltration.

5. The method of claim 3, wherein the core is of rubber, plastic, metal, ceramic or carbon.

6. The method of claim 5, wherein the core is selected from the group consisting of styrene and hard foam plastic.

7. The method of claim 6, wherein the core is dissolved out by a solvent.

8. The method of claim 3, wherein the core is of a pyrolyzable material and subsequently the carbon body is subjected to pyrolysis and the core is eliminated substantially residue-free.

9. The method of claim 8, wherein the core is formed of polyvinyl alcohol.

10. The method of claim 1, wherein carbon fiber layers of a given orientation defining the cavities are placed in the carbon body in the area of said cavities.

11. The method of claim 10, wherein the carbon fiber layers are built up on the core.

12. The method of claim 1, wherein recesses are made in two bodies in the area of their junction surfaces such that they make up a common cavity.

13. A method of manufacturing a friction element comprising preparing a plurality of green bodies as preforms of a friction element from carbon fibers, added or infiltrated with a polymer, structuring said green bodies to form closed cavities in defined inner areas of said friction element for cooling and/or stiffening of said friction element, pyrolyzing said green bodies to form porous carbon bodies;

joining the plurality of porous carbon bodies whereby a junction is formed;

infiltrating the pores and junction of said carbon body with fluid silicon; and ceramicizing said silicon infiltrated carbon body by introducing a chemical reaction to form silicon carbide.

14. The method of claim 13, wherein at least one green body is provided with recesses by mechanical working.

15. The method of claim 13, wherein a core is embedded in at least one green body, the core having dimensions substantially corresponding to the cavities to be formed.

16. The method of claim 15, wherein said core is removed before the silicon infiltration step.

17. The method of claim 16, wherein the core is of rubber, plastic, metal, ceramic or carbon.

18. The method of claim 15, wherein vent passages are provided.

* * * * *

UNITED STATES PATENT AND TRADEMARK OFFICE
CERTIFICATE OF CORRECTION

PATENT NO. : 6,086,814
DATED : July 11, 2000
INVENTOR(S) : Krenkel, et. al.

It is certified that error appears in the above-identified patent and that said Letters Patent is hereby corrected as shown below:

In cover page, in the section entitled Assignee, change "Cologne" to - - Köln - -.
In cover page, after "Paik" start a new sentence - - Attorney, Agent, or Firm, Fulbright & Jaworski, LLP - -.
In column 3, line 26, change "," to - - . - -.
In column 4, line 16, change "is" to - - illustrates - -.
In column 4, line 20, change "is" to - - illustrates - -.
In column 4, line 31, after ";" insert - - and - -.

Signed and Sealed this

Twenty-second Day of May, 2001

Attest:

NICHOLAS P. GODICI

Attesting Officer

Acting Director of the United States Patent and Trademark Office